(12) United States Patent
Li et al.

(10) Patent No.: US 10,912,018 B2
(45) Date of Patent: Feb. 2, 2021

(54) PDU TYPE SETTING METHOD, UE POLICY SETTING METHOD, AND RELATED ENTITY

(71) Applicant: Huawei Technologies Co., Ltd., Shenzhen (CN)

(72) Inventors: Xiaojuan Li, Beijing (CN); Haorui Yang, Shenzhen (CN); Hui Jin, Beijing (CN); Guowei Ouyang, Beijing (CN); Fenghui Dou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/787,655

(22) Filed: Feb. 11, 2020

(65) Prior Publication Data

US 2020/0221376 A1 Jul. 9, 2020

Related U.S. Application Data

(63) Continuation of application No. PCT/CN2017/097107, filed on Aug. 11, 2017.

(51) Int. Cl.
*H04W 48/18* (2009.01)
*H04W 76/11* (2018.01)
(Continued)

(52) U.S. Cl.
CPC .......... *H04W 48/18* (2013.01); *H04L 61/6054* (2013.01); *H04W 8/08* (2013.01);
(Continued)

(58) Field of Classification Search
None
See application file for complete search history.

(56) References Cited

U.S. PATENT DOCUMENTS

2002/0199019 A1 12/2002 Battin et al.
2007/0041382 A1 2/2007 Vayanos et al.
(Continued)

FOREIGN PATENT DOCUMENTS

CN 1394091 A 1/2003
CN 1529478 A 9/2004
(Continued)

OTHER PUBLICATIONS

U.S. Appl. No. 62/503,519, Backman, filed May 9, 2017 (Year: 2017).*

(Continued)

Primary Examiner — Jay L Vogel
(74) Attorney, Agent, or Firm — Conley Rose, P.C.

(57) ABSTRACT

A protocol data unit (PDU) type setting method, a user equipment (UE) policy setting method, and a related entity, where the PDU type setting method includes: setting, by UE, a requested PDU type of a PDU session in a process of establishing the PDU session, where the requested PDU type of the PDU session is set by the UE based on a first condition, the first condition includes an Internet Protocol (IP) version corresponding to an application, and the application is associated with the PDU session. In the embodiments of the present disclosure, the requested PDU type of the PDU session can be consistent with a PDU type requested by the application, such that the application can normally perform communication.

18 Claims, 8 Drawing Sheets

(51) Int. Cl.

| | | |
|---|---|---|
| *H04L 29/12* | (2006.01) | |
| *H04W 8/08* | (2009.01) | |
| *H04W 40/02* | (2009.01) | |
| *H04W 48/16* | (2009.01) | |
| *H04W 80/10* | (2009.01) | |
| *H04W 80/12* | (2009.01) | |
| *H04L 29/06* | (2006.01) | |
| *H04W 8/20* | (2009.01) | |
| *H04W 60/04* | (2009.01) | |
| *H04W 8/24* | (2009.01) | |
| *H04W 8/26* | (2009.01) | |
| *H04W 80/04* | (2009.01) | |
| *H04W 76/12* | (2018.01) | |
| *H04W 24/02* | (2009.01) | |
| *H04W 76/10* | (2018.01) | |

(52) U.S. Cl.
CPC ........... *H04W 40/02* (2013.01); *H04W 48/16* (2013.01); *H04W 76/11* (2018.02); *H04W 80/10* (2013.01); *H04W 80/12* (2013.01)

(56) References Cited

U.S. PATENT DOCUMENTS

| | | | | |
|---|---|---|---|---|
| 2009/0232022 | A1* | 9/2009 | Savolainen | B07B 1/46 370/254 |
| 2011/0038322 | A1* | 2/2011 | Liang | H04W 76/12 370/328 |
| 2015/0215845 | A1 | 7/2015 | Pinheiro et al. | |
| 2018/0324577 | A1* | 11/2018 | Faccin | H04W 48/18 |
| 2019/0289666 | A1* | 9/2019 | Backman | H04W 80/045 |
| 2020/0084675 | A1* | 3/2020 | Lu | H04W 48/16 |

FOREIGN PATENT DOCUMENTS

| | | |
|---|---|---|
| CN | 101034934 A | 9/2007 |
| CN | 101199158 A | 6/2008 |
| CN | 101978741 A | 2/2011 |
| WO | 2014084499 A1 | 6/2014 |
| WO | 2017023346 A1 | 2/2017 |

OTHER PUBLICATIONS

S2-172122, Samsung, "23.501: Update of UE Route Selection Policy," SA WG2 Meeting #120, Mar. 27-31, 2017 Busan, South Korea, 4 pages.

S2-173014, Ericsson, "TS 23.501: Clean up of PCF and reference point names for PCC," SA WG2 Meeting #121, May 15-19, 2017, Hangzhou, China, 36 pages.

S2-173918, Ericsson, "23.501: Selection of IP version during setup of a PDU session," SA WG2 Meeting #121, May 15-19, 2017, Hangzhou, China, 4 pages.

S2-177159, Huawei, HiSilicon, "23.503:OI8a URSP update: DNN and PDU type," SA WG2 Meeting #123, Oct. 23-27, 2017, Ljubljana, Slovenia, 3 pages.

S2-178890, Huawei, HiSilicon, "23.503: Clarification on URSP," SA WG2 Meeting #124, Nov. 27-Dec. 1, 2017, Reno, Nevada, USA, 13 pages.

S2-173106, Qualcomm Incorporated, "TS 23.502: handling of PDU sessions at slice unavailability," SA WG2 Meeting #121, May 15-19, 2017, Hangzhou, P.R. China, 33 pages.

3GPP TS 23.501 V1.2.0, Jul. 2017, "3rd Generation Partnership Project; Technical Specification Group Services and System Aspects; System Architecture for the 5G System; Stage 2 (Release 15)," 166 pages.

\* cited by examiner

PDU TYPE SETTING METHOD, UE POLICY SETTING METHOD, AND RELATED ENTITY

CROSS-REFERENCE TO RELATED APPLICATIONS

This application is a continuation of International Patent Application No. PCT/CN2017/097107, filed on Aug. 11, 2017, the disclosure of which is hereby incorporated by reference in its entirety.

TECHNICAL FIELD

This application relates to the communications field, and in particular, to a protocol data unit (PDU) type setting method, a user equipment (UE) policy setting method, and a related entity, and the related entity includes UE and a policy control function (PCF) entity.

BACKGROUND

An Internet Protocol (IP) address management part in the 5th generation (5G) mobile communication technology protocol specifies the following content: a UE sets a requested PDU type based on an IP stack capability of the UE and a configuration of a data network name (DNN) in a process of establishing a PDU session. The requested PDU type is "IP" when IP versions supported by the DNN configured in the UE are the Internet Protocol version 6 (IPv6) and the Internet Protocol version 4 (IPv4). The PDU type "IP" indicates that IP versions of the PDU session are IPv4 and IPv6. The requested PDU type is "IPv4" when an IP version supported by the DNN configured in the UE is only IPv4. The PDU type "IPv4" indicates that an IP version of the PDU session is IPv4. The requested PDU type is "IPv6" when an IP version supported by the DNN configured in the UE is only IPv6. The PDU type "IPv6" indicates that an IP version of the PDU session is IPv6. When the DNN configured in the UE does not support a specified IP version, the UE sets the requested PDU type based on the IP stack capability of the UE. For example, the PDU type requested by the UE whose IP stack capabilities are IPv4 and IPv6 is "IP". When the DNN configured in the UE does not support a specified IP version and an IP version capability (namely, the IP stack capability) of the UE is unknown, the UE sets the requested PDU type to "IP". The IP stack capability of the UE may also be referred to as the IP version capability or a device capability of the UE, the IP version supported by the DNN may also be referred to as a DNN capability, and the requested PDU type of the PDU session may be referred to as a requested IP version of the PDU session. A correspondence among the IP stack capability of the UE, the IP version supported by the DNN, and the requested PDU type of the PDU session may be shown in Table 1.

TABLE 1

A table of a correspondence among an IP stack capability of UE, an IP version supported by a DNN, and a requested PDU type of a PDU session

| IP stack capability of UE | IP version supported by a DNN | Requested PDU type of a PDU session |
|---|---|---|
| IPv4 | IPv4 | IPv4 |
| IPv6 | IPv6 | IPv6 |
| IPv4 | IPv4 and IPv6 | IPv4 |
| IPv6 | IPv4 and IPv6 | IPv6 |
| IPv4 and IPv6 | IPv4 | IPv4 |
| IPv4 and IPv6 | IPv6 | IPv6 |
| IPv4 and IPv6 | IPv4 and IPv6 | IP (IPv4 and IPv6) |

It can be learned from Table 1 that, when the UE requests to establish the PDU session, the requested PDU type of the PDU session is determined based on the IP version supported by the DNN and the IP stack capability of the UE. A principle is to select an IP version jointly supported by the IP stack capability of the UE and the IP version supported by the DNN, that is, select an intersection of the IP stack capability of the UE and the IP version supported by the DNN.

It can be learned from other approaches that, when the UE requests to establish the PDU session, the requested PDU type of the PDU session is determined based on the IP version supported by the DNN and the IP stack capability of the UE. However, if the UE requests a PDU session associated with a specific application, and the application has a specified IP version, an IP version selected based on the IP version supported by the DNN and the IP stack capability of the UE may be inconsistent with an IP version requested by the application. For example, if IP versions supported by the DNN are IPv4 and IPv6, and IP stack capabilities of the UE are IPv4 and IPv6, the PDU type requested by the UE when the UE initiates the PDU session may be IPv4 or IPv6. If the requested PDU type of the PDU session is IPv4, but a PDU type requested by the application is IPv6, the requested PDU type of the PDU session is inconsistent with the PDU type requested by the application. Consequently, the application cannot normally perform communication.

SUMMARY

Embodiments of the present disclosure provide a PDU type setting method, a UE policy setting method, and a related entity, such that a requested PDU type of a PDU session can be consistent with a PDU type requested by an application, and the application can normally perform communication.

According to a first aspect, a PDU type setting method is provided. A UE sets a requested PDU type of a PDU session in a process of establishing the PDU session, where the requested PDU type of the PDU session is set by the UE based on a first condition, where the first condition includes an IP version corresponding to an application associated with the PDU session. It may be understood that, that the application is associated with the PDU session means that the application transmits data using the PDU session or transmits data traffic of the application using the PDU session.

In this embodiment of the present disclosure, when setting the requested PDU type of the PDU session in the process of establishing the PDU session, the UE considers the IP version corresponding to the application associated with the PDU session. Therefore, the requested PDU type of the PDU session can be consistent with a PDU type requested by the application, such that the application can normally perform communication.

In a possible implementation, before the UE sets the requested PDU type of the PDU session, the UE receives a UE policy from a PCF, where the UE policy includes the IP version corresponding to the application. In this implementation, the UE receives the UE policy from the PCF, where the UE policy includes the IP version corresponding to the application. As such, the UE can set the requested PDU type of the PDU session based on the IP version corresponding to the application.

In a possible implementation, before the UE sets the requested PDU type of the PDU session, the UE receives a UE policy from a PCF, where the UE policy includes the IP version corresponding to the application and a DNN. In this implementation, the UE receives the UE policy from the PCF, where the UE policy includes the IP version corresponding to the application and the DNN. As such, the UE can set the requested PDU type of the PDU session based on the IP version corresponding to the application and an IP version supported by the DNN.

In a possible implementation, the IP version corresponding to the application includes an IP version requested by the application or an IP version recommended by the application. The IP version requested by the application or the IP version recommended by the application may be configured in the UE. The UE may obtain, from configuration information, the IP version requested by the application or the IP version recommended by the application. Alternatively, the UE may obtain, from the UE policy received from the PCF, the IP version requested by the application or the IP version recommended by the application. In this implementation, two methods that can reflect the IP version requested by the application are provided. One form is used to directly obtain the IP version requested by the application. The other form is used to indirectly obtain the IP version requested by the application, that is, indirectly obtain, using the IP version recommended by the application, the IP version requested by the application.

In a possible implementation, the IP version recommended by the application is an IP version determined based on an IP version supported by the DNN and the IP version requested by the application. In this implementation, the IP version recommended by the application reflects both the IP version requested by the application and the IP version supported by the DNN, and therefore includes rich information.

In a possible implementation, the setting, by UE, a requested PDU type of a PDU session in a process of establishing the PDU session includes setting, by the UE in the process of establishing the PDU session, the requested PDU type of the PDU session to the IP version corresponding to the application. In this implementation, both an IP stack capability of the UE and the IP version supported by the DNN usually support both IPv4 and IPv6. Therefore, processing resources can be saved when only the IP version corresponding to the application is considered to set the requested PDU type of the PDU session.

In a possible implementation, the first condition further includes at least one of the following: an IP stack capability of the UE or the IP version supported by the DNN. In this implementation, when setting the requested PDU type of the PDU session, the UE not only considers the IP version corresponding to the application, but also considers the IP stack capability of the UE and/or the IP version supported by the DNN, to adapt to a case in which at least one of the IP stack capability of the UE and the IP version supported by the DNN does not support both IPv4 and IPv6.

In a possible implementation, when the first condition includes the IP version corresponding to the application and the IP stack capability of the UE, the UE sets, in the process of establishing the PDU session, the requested PDU type of the PDU session to an intersection of the IP version corresponding to the application and the IP stack capability of the UE. In this implementation, the UE sets the requested PDU type of the PDU session to the intersection of the IP version corresponding to the application and the IP stack capability of the UE. As such, the PDU type meets both an application requirement and a UE capability requirement, thereby correspondingly improving a possibility that the application can normally perform communication.

In a possible implementation, when the IP version corresponding to the application is the IP version requested by the application, and the first condition includes the IP version requested by the application and the IP version supported by the DNN, the UE sets, in the process of establishing the PDU session, the requested PDU type of the PDU session to an intersection of the IP version requested by the application and the IP version supported by the DNN. In this implementation, the UE sets the requested PDU type of the PDU session to the intersection of the IP version requested by the application and the IP version supported by the DNN. As such, the PDU type meets both an application requirement and a DNN capability requirement, thereby correspondingly improving a possibility that the application can normally perform communication.

In a possible implementation, when the IP version corresponding to the application is the IP version requested by the application, and the first condition includes the IP version requested by the application, the IP stack capability of the UE, and the IP version supported by the DNN, the UE sets, in the process of establishing the PDU session, the requested PDU type of the PDU session to an intersection of the IP version requested by the application, the IP stack capability of the UE, and the IP version supported by the DNN. In this implementation, the UE sets the requested PDU type of the PDU session to the intersection of the IP version requested by the application, the IP stack capability of the UE, and the IP version supported by the DNN, such that the PDU type meets an application requirement, a UE capability requirement, and a DNN capability requirement, thereby correspondingly improving a possibility that the application can normally perform communication.

According to a second aspect, a UE policy setting method is provided. A PCF sends a UE policy to UE, where the UE policy includes an IP version corresponding to an application. The IP version corresponding to the application is used by the UE to set a requested PDU type of a PDU session, and the application is associated with the PDU session.

In this embodiment of the present disclosure, the PCF sends the UE policy to the UE, where the UE policy includes the IP version corresponding to the application. As such, the UE can set the requested PDU type of the PDU session based on the IP version corresponding to the application.

In a possible implementation, the IP version corresponding to the application includes an IP version requested by the application or an IP version recommended by the application. In this implementation, the IP version corresponding to the application can have different forms, and therefore is highly flexible.

In a possible implementation, before the PCF sends the UE policy to the UE, the PCF determines, based on an IP version supported by a DNN and the IP version requested by the application, the IP version recommended by the application, where the IP version corresponding to the application is the IP version recommended by the application. In this implementation, the IP version recommended by the application reflects both the IP version requested by the application and the IP version supported by the DNN, and therefore includes a large amount of information.

In a possible implementation, the UE policy further includes the DNN. In this implementation, the PCF sends the UE policy to the UE, such that the UE can not only obtain the IP version corresponding to the application, but also obtain the DNN. In this way, when setting the requested PDU type of the PDU session, the UE can not only consider the IP version corresponding to the application associated with the PDU session, but also consider the IP version supported by the DNN. Therefore, the requested PDU type of the PDU session can be consistent with a PDU type requested by the application, and can also be consistent with the IP version supported by the DNN.

According to a third aspect, UE is provided. The UE may implement a function performed in the method design according to the first aspect, and the function may be implemented by hardware, or may be implemented by hardware by executing corresponding software. The hardware or the software includes one or more modules corresponding to the function.

According to a fourth aspect, UE is provided. A structure of the UE includes a processor and a memory. The processor is configured to support the UE in performing a corresponding function in the method according to the first aspect. The memory is configured to be coupled to the processor, and the memory stores a program instruction and data that are necessary for the UE. The UE may further include a communications interface configured to send or receive information or the like.

According to a fifth aspect, a PCF is provided. The PCF may implement a function performed in the method design according to the second aspect. Additionally, the function may be implemented by hardware, or may be implemented by hardware by executing corresponding software. The hardware or the software includes one or more modules corresponding to the function.

According to a sixth aspect, a PCF is provided. A structure of the PCF includes a processor and a memory. The processor is configured to support the PCF in performing a corresponding function in the method according to the second aspect. The memory is configured to be coupled to the processor, and the memory stores a program instruction and data that are necessary for the PCF. The PCF may further include a communications interface configured to send or receive information or the like.

According to a seventh aspect, a chip is provided. The chip may be disposed in a device, and the chip includes a processor and an interface. The processor is configured to support the chip in performing a corresponding function in the method according to the first aspect. The interface is configured to support the chip in communicating with another chip or another network element. The chip may further include a memory. The memory is configured to be coupled to the processor, and the memory stores a program instruction and data that are necessary for the chip.

According to an eighth aspect, a chip is provided. The chip may be disposed in a device, and the chip includes a processor and an interface. The processor is configured to support the chip in performing a corresponding function in the method according to the second aspect. The interface is configured to support the chip in communicating with another chip or another network element. The chip may further include a memory. The memory is configured to be coupled to the processor, and the memory stores a program instruction and data that are necessary for the chip.

According to a ninth aspect, a computer storage medium is provided. The computer storage medium is configured to store a computer software instruction used by the foregoing UE, where the computer storage medium includes a program designed to perform the first aspect.

According to a tenth aspect, a computer storage medium is provided. The computer storage medium is configured to store a computer software instruction used by the foregoing PCF, where the computer storage medium includes a program designed to perform the second aspect.

According to an eleventh aspect, a computer program product is provided, including an instruction. When the program is executed by a computer, the instruction enables the computer to perform a function performed by the UE in the method design according to the first aspect.

According to a twelfth aspect, an embodiment of the present disclosure provides a computer program product, including an instruction. When the program is executed by a computer, the instruction enables the computer to perform a function performed by the PCF in the method design according to the second aspect.

DESCRIPTION OF EMBODIMENTS

Embodiments of the present disclosure provide a PDU type setting method in which a UE sets a requested PDU type of a PDU session in a process of establishing the PDU session. The requested PDU type of the PDU session is set by the UE based on a first condition, where the first condition includes an IP version corresponding to an application associated with the PDU session. It may be understood that, that the application is associated with the PDU session means that the application transmits data using the PDU session or transmits data traffic of the application using the PDU session.

In the embodiments of the present disclosure, when setting the requested PDU type of the PDU session in the process of establishing the PDU session, the UE considers the IP version corresponding to the application associated with the PDU session. Therefore, the requested PDU type of the PDU session can be consistent with a PDU type requested by the application, such that the application can normally perform communication.

In a possible implementation, the IP version corresponding to the application includes an IP version requested by the application or an IP version recommended by the application. The IP version requested by the application or the IP version recommended by the application may be configured in the UE. The UE may obtain, from configuration information, the IP version requested by the application or the IP version recommended by the application. Alternatively, the UE may obtain, from a UE policy received from a PCF, the IP version requested by the application or the IP version recommended by the application. In this implementation, two methods that can reflect the IP version requested by the application are provided. One form is used to directly obtain the IP version requested by the application. The other form is used to indirectly obtain the IP version requested by the application, that is, indirectly obtain, using the IP version recommended by the application, the IP version requested by the application.

Figure 1:
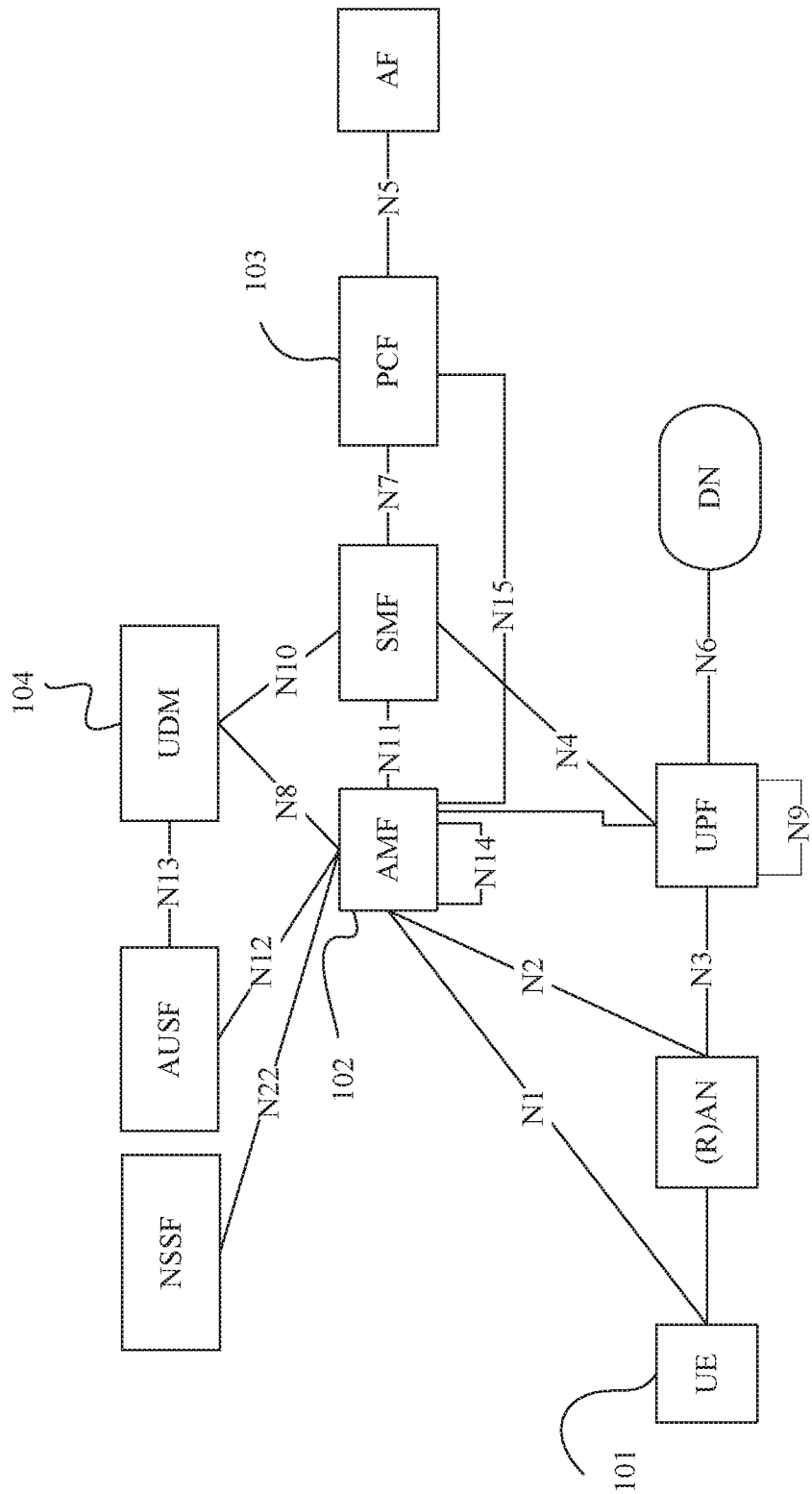
FIG. 1 is a schematic diagram of an application scenario according to an embodiment of the present disclosure.

FIG. 1 is a schematic diagram of an application scenario according to an embodiment of the present disclosure. The scenario is based on a 5G system architecture. Main network entities in the scenario include: a UE 101 configured to: store one or more applications; and establish a PDU session, such that the application can normally perform communication, where the UE 101 needs to set a requested PDU type of the PDU session in a process of establishing the PDU session; a mobility management function such as an Access and Mobility Management Function (AMF) entity 102 configured to be responsible for mobility management of the UE 101, including registration, location update, and the like; a PCF 103 configured to store a UE policy, including a user equipment route selection policy (URSP); and a unified data management (UDM) function entity 104 configured to store subscription information of the UE 101, including an international mobile subscriber identity (IMSI) of the UE 101 and a context of the UE 101.

The UE policy may be but is not limited to the URSP. It can be learned from descriptions of the URSP in the 5G protocol that the PCF stores the URSP, and a DNN selection policy in the URSP is used to select one or more DNNs for the PDU session. The URSP may include one or more rules corresponding to each application. The rule may be formulated by an operator or formulated by an operator based on a requirement of an application service provider. The rule usually includes a DNN. Table 2 shows an example of a common URSP. Table 2 also shows a correspondence between an application name and a DNN.

TABLE 2

A table of a correspondence between an application name and a DNN in a URSP

| Application name | DNN |
|---|---|
| App 1 | Default |
| App 2 | Internet |

It can be learned from Table 2 that, because the DNN corresponding to the App 1 is not specified in the URSP, the UE may consider the DNN of the application as a default value, where the DNN corresponding to the App 2 is the Internet. After determining the DNN corresponding to the application, the UE may determine the requested PDU type of the PDU session based on an IP version supported by the DNN, where the requested PDU type of the PDU session is a requested IP version of the PDU session. Alternatively, the UE may determine the requested PDU type of the PDU session based on an IP version supported by the DNN and an IP stack capability of the UE.

It can be learned from the foregoing analysis that the common URSP includes only the DNN, and does not include a PDU type requested by the application (namely, an IP version requested by the application). When determining the requested PDU type of the PDU session, the UE usually determines the requested PDU type of the PDU session based on the IP version supported by the DNN and/or the IP stack capability of the UE. As a result, the requested PDU type of the PDU session may be inconsistent with the IP version requested by the application, and consequently the application cannot normally perform communication.

In an embodiment of the present disclosure, the URSP is modified such that the UE can obtain an IP version requested by an application. Table 3 shows an example of a modified URSP provided in this embodiment of the present disclosure. Table 3 also shows a correspondence between an application name and an IP version requested by an application.

TABLE 3

A table of a correspondence between an application name and an IP version requested by an application in a URSP

| Application name | IP version requested by an application |
|---|---|
| App 1 | IPv4 |
| App 2 | IPv6 |

It can be learned from Table 3 that the IP version requested by the App 1 is IPv4 and the IP version requested by the App 2 is IPv6. After determining the application associated with the PDU session, the UE may determine a requested IP version of the PDU session based on the IP version requested by the application, that is, determine the requested PDU type of the PDU session. Alternatively, the UE may determine a requested IP version of the PDU session based on the IP version requested by the application and an IP stack capability of the UE.

In another embodiment of the present disclosure, the URSP is modified, such that the UE can obtain an IP version requested by an application. Table 4 shows an example of a modified URSP provided in this embodiment of the present disclosure. Table 4 also shows a correspondence among an application name, an IP version requested by an application, and a DNN.

TABLE 4

A table of a correspondence among an application name, an IP version requested by an application, and a DNN in a URSP

| Application name | IP version requested by an application | DNN |
|---|---|---|
| App 1 | IPv4 | Default |
| App 2 | IPv6 | Internet |

It can be learned from Table 4 that the IP version requested by the App 1 is IPv4, the DNN of the App 1 is considered as a default value, the IP version requested by the App 2 is IPv6, and the DNN corresponding to the App 2 is the Internet. After determining the application associated with the PDU session, the UE may determine a requested IP version of the PDU session based on the IP version requested by the application and an IP version supported by the DNN. Alternatively, the UE may determine a requested IP version of the PDU session based on the IP version requested by the application, an IP version supported by the DNN, and an IP stack capability of the UE.

In still another embodiment of the present disclosure, the URSP is modified, such that the UE can obtain an IP version recommended by an application. Table 5 shows an example of a modified URSP provided in this embodiment of the present disclosure. Table 5 also shows a correspondence between an application name and an IP version recommended by an application.

TABLE 5

A table of a correspondence between an application name and an IP version recommended by an application in a URSP

| Application name | IP version recommended by an application |
|---|---|
| App 1 | IPv4 |
| App 2 | IPv6 |

It can be learned from Table 5 that the IP version recommended by the App 1 is IPv4 and the IP version recommended by the App 2 is IPv6. After determining the application associated with the PDU session, the UE may determine a requested IP version of the PDU session based on the IP version recommended by the application. Alternatively, the UE may determine a requested IP version of the PDU session based on the IP version recommended by the application and an IP stack capability of the UE.

An embodiment of the present disclosure provides a PDU type setting method. The method may be based on the application scenario shown in FIG. 1. A UE sets a requested PDU type of a PDU session in a process of establishing the PDU session. The requested PDU type of the PDU session is set by the UE based on a first condition. The first condition includes an IP version corresponding to an application, where the application is associated with the PDU session. It may be understood that the UE may obtain the IP version corresponding to the application from a URSP received from a PCF, and this is not limited. The IP version corresponding to the application includes an IP version requested by the application or an IP version recommended by the application. The IP version recommended by the application is an IP version determined based on an IP version supported by a DNN and the IP version requested by the application.

In this embodiment of the present disclosure, when setting the requested PDU type of the PDU session in the process of establishing the PDU session, the UE considers the IP version corresponding to the application associated with the PDU session. Therefore, the requested PDU type of the PDU session can be consistent with a PDU type requested by the application, such that the application can normally perform communication.

The following describes, using an example in which the PCF sends one of the foregoing modified URSPs to the UE, the PDU type setting method provided in this embodiment of the present disclosure.

Figure 2:
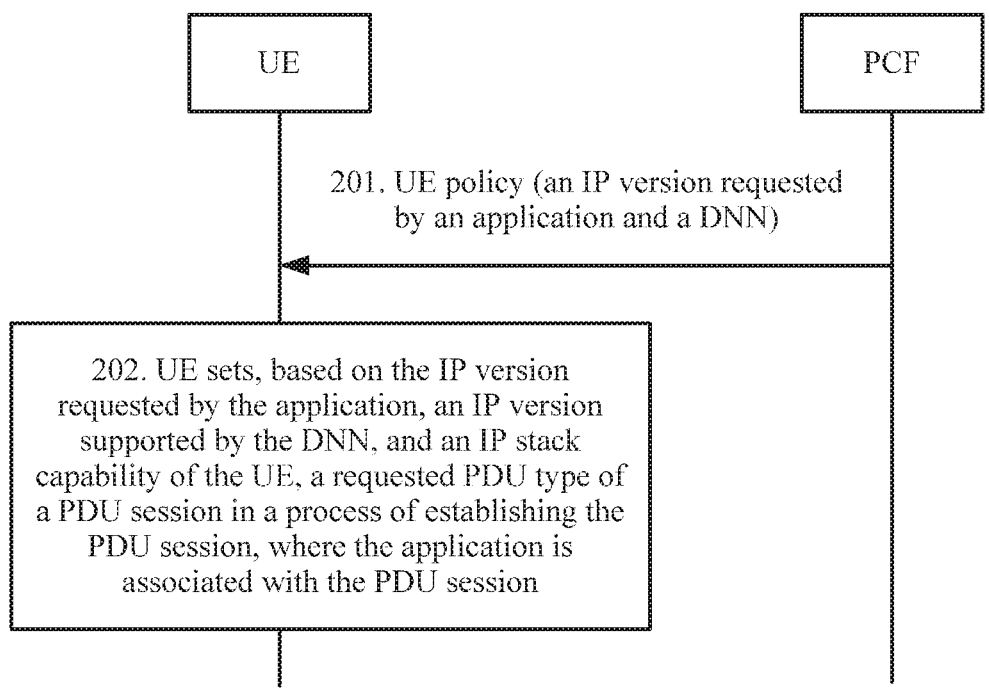
FIG. 2 is a schematic communication diagram of a PDU type setting method according to an embodiment of the present disclosure.

FIG. 2 is a schematic communication diagram of a PDU type setting method according to an embodiment of the present disclosure. An IP version corresponding to an application is an IP version requested by the application. The method includes the following steps.

Step 201. A PCF sends a UE policy to a UE, where the UE policy includes an IP version requested by an application and a DNN.

Applications may have different DNNs. In this case, the DNN is a DNN of the application. For example, if the DNN is the Internet, it indicates that a data network of the application is the Internet.

In an example, the IP version requested by the application may include "IPv4", "IPv6", and "IP". "IP" indicates that the application supports both IPv4 and IPv6.

Step 202. The UE sets, based on the IP version requested by the application, an IP version supported by the DNN, and an IP stack capability of the UE, a requested PDU type of a PDU session in a process of establishing the PDU session, where the application is associated with the PDU session.

It may be understood that, that the application is associated with the PDU session means that the application transmits data using the PDU session or transmits data traffic of the application using the PDU session.

The UE may determine, based on the DNN included in the UE policy, the IP version supported by the DNN. A correspondence between a DNN and an IP version supported by the DNN may be pre-stored in the UE, and the IP stack capability of the UE may also be pre-stored in the UE.

In an example, the UE sets, in the process of establishing the PDU session, the requested PDU type of the PDU session to an intersection of the IP version requested by the application, the IP stack capability of the UE, and the IP version supported by the DNN. To be more specific, the UE selects, as the requested PDU type of the PDU session, an IP version jointly supported by the IP version requested by the application, the IP stack capability of the UE, and the IP version supported by the DNN. For example, if the IP version requested by the application is IPv4, and both the IP stack capability of the UE and the IP version supported by the DNN support both IPv4 and IPv6, the IP version jointly supported by the IP version requested by the application, the IP stack capability of the UE, and the IP version supported by the DNN is IPv4. In this case, IPv4 is used as the requested PDU type of the PDU session.

In this implementation, the UE sets the requested PDU type of the PDU session to the intersection of the IP version requested by the application, the IP stack capability of the UE, and the IP version supported by the DNN. As such, the PDU type meets an application requirement, a UE capability requirement, and a DNN capability requirement, thereby correspondingly improving a possibility that the application can normally perform communication.

The following describes, using an example, the PDU type setting method provided in this embodiment of the present disclosure.

Figure 3:
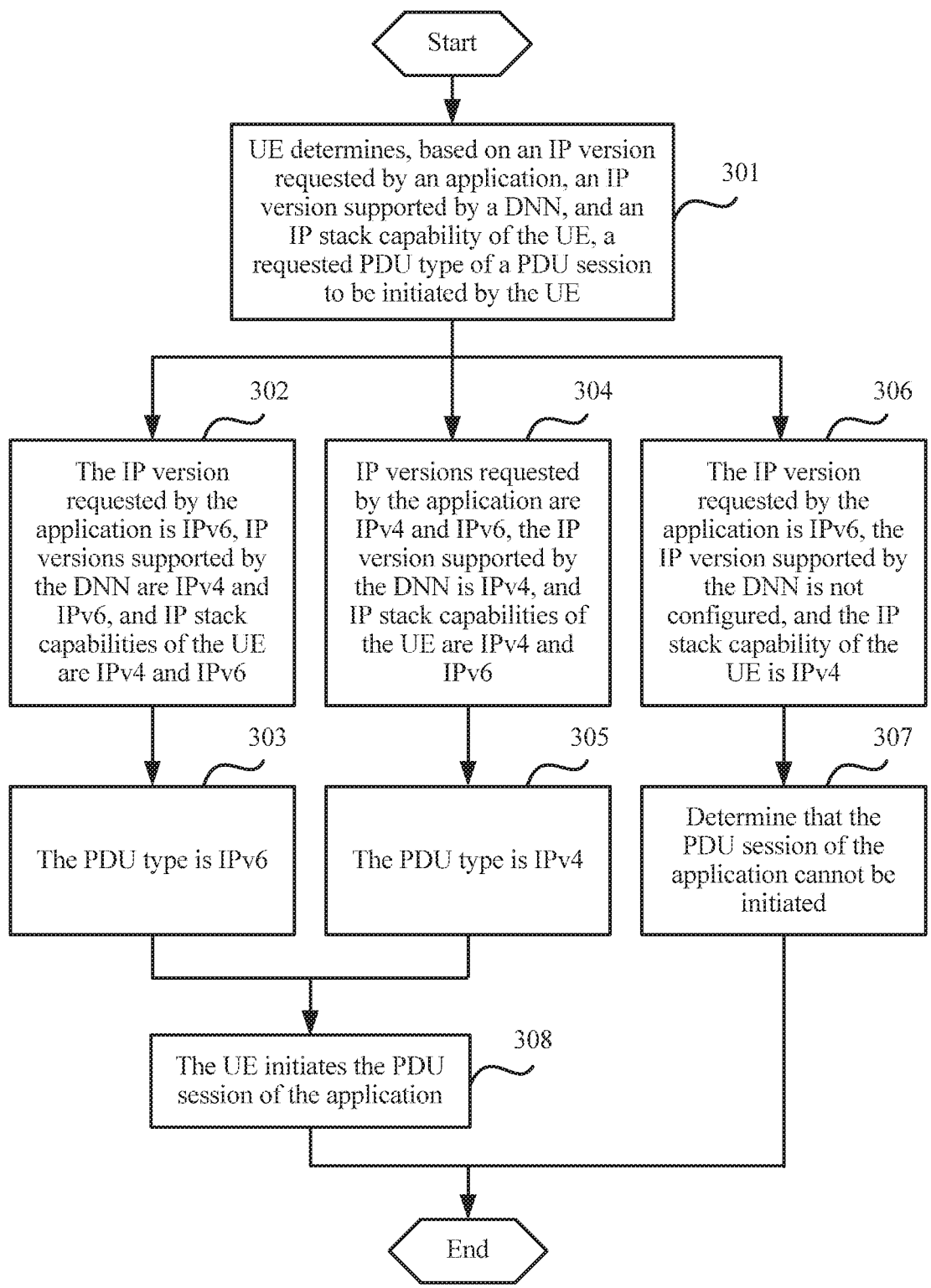
FIG. 3 is a flowchart of a method in which a requested IP version of a PDU session is determined based on an IP version requested by an application according to an embodiment of the present disclosure.

FIG. 3 is a flowchart of a method in which a requested IP version of a PDU session is determined based on an IP version requested by an application according to an embodiment of the present disclosure. The method includes the following steps.

Step 301. A UE determines, based on an IP version requested by an application, an IP version supported by a DNN, and an IP stack capability of the UE, a requested PDU type of a PDU session to be initiated by the UE.

In an example, when there is an IP version jointly supported by the IP version requested by the application, the IP version supported by the DNN, and the IP stack capability of the UE, the UE determines the jointly supported IP version as the requested PDU type of the PDU session to be initiated by the UE, and the UE subsequently initiates the PDU session of the application based on the determined PDU type. When there is no IP version jointly supported by the IP version requested by the application, the IP version supported by the DNN, and the IP stack capability of the UE, the UE cannot initiate the PDU session of the application.

Step 302. Obtain the following information: the IP version requested by the application is IPv6, IP versions supported by the DNN are IPv4 and IPv6, and IP stack capabilities of the UE are IPv4 and IPv6.

In an example, the UE may be configured to: receive a URSP from a PCF; obtain, from the URSP, the IP version requested by the application and the DNN; determine, based on a pre-stored correspondence between a DNN and an IP version supported by the DNN, the IP version supported by the DNN; and obtain the pre-stored IP stack capability of the UE.

Step 303. Determine, based on the information obtained in step 302, that the PDU type is IPv6.

In an example, the UE may select, as the requested PDU type of the PDU session, an intersection of the IP version requested by the application, the IP version supported by the DNN, and the IP stack capability of the UE.

After determining the PDU type, the UE may subsequently perform step 308.

Step 304. Obtain the following information: IP versions requested by the application are IPv4 and IPv6, the IP version supported by the DNN is IPv4, and IP stack capabilities of the UE are IPv4 and IPv6.

In an example, the UE may be configured to: receive a URSP from a PCF; obtain, from the URSP, the IP version requested by the application and the DNN; determine, based on a pre-stored correspondence between a DNN and an IP version supported by the DNN, the IP version supported by the DNN; and obtain the pre-stored IP stack capability of the UE.

Step 305. Determine, based on the information obtained in step 304, that the PDU type is IPv4.

In an example, the UE may select, as the requested PDU type of the PDU session, an intersection of the IP version requested by the application, the IP version supported by the DNN, and the IP stack capability of the UE.

After determining the PDU type, the UE may subsequently perform step 308.

Step 306. Determine that the IP version requested by the application is IPv6, the IP version supported by the DNN is not configured, and the IP stack capability of the UE is IPv4.

In an example, the UE may be configured to: receive a URSP from a PCF; obtain, from the URSP, the IP version requested by the application and the DNN; determine, based on a pre-stored correspondence between a DNN and an IP version supported by the DNN, the IP version supported by the DNN; and obtain the pre-stored IP stack capability of the UE.

Step 307. Determine, based on the information obtained in step 306, that the PDU session of the application cannot be initiated.

In an example, the UE may determine whether the IP version requested by the application, the IP version supported by the DNN, and the IP stack capability of the UE have an intersection. When the IP version requested by the application, the IP version supported by the DNN, and the IP stack capability of the UE have no intersection, the UE determines that the PDU session of the application cannot be initiated.

Step 308. The UE initiates the PDU session of the application based on the determined PDU type.

In an example, the UE may determine whether the IP version requested by the application, the IP version supported by the DNN, and the IP stack capability of the UE have an intersection. When the IP version requested by the application, the IP version supported by the DNN, and the IP stack capability of the UE have an intersection, the UE uses, as the requested PDU type of the PDU session, the intersection of the IP version requested by the application, the IP version supported by the DNN, and the IP stack capability of the UE. Then the UE initiates the PDU session of the application based on the determined PDU type.

It can be learned from FIG. 3 that the UE determines, based on the IP version requested by the application, the IP version supported by the DNN, and the IP stack capability of the UE, the PDU type of the PDU session to be initiated by the UE. If the IP version requested by the application, the IP version supported by the DNN, and the IP stack capability of the UE have an intersection, the UE initiates the PDU session of the application. If the IP version requested by the application, the IP version supported by the DNN, and the IP stack capability of the UE have no intersection, the UE cannot initiate the PDU session of the application.

In this embodiment of the present disclosure, the UE first determines whether the IP version requested by the application, the IP version supported by the DNN, and the IP stack capability of the UE have an intersection. When the IP version requested by the application, the IP version supported by the DNN, and the IP stack capability of the UE have no intersection, the UE determines that the PDU session of the application cannot be initiated. As such, network resources can be saved, that is, the PDU session is established without wasting the network resources. When the IP version requested by the application, the IP version supported by the DNN, and the IP stack capability of the UE have an intersection, the UE uses, as the requested PDU type of the PDU session, the intersection of the IP version requested by the application, the IP version supported by the DNN, and the IP stack capability of the UE. The UE then initiates the PDU session of the application based on the determined PDU type, such that a possibility that the application can normally perform communication can be improved.

In this embodiment of the present disclosure, because a UE policy includes both the DNN and the IP version requested by the application, the UE may set the requested PDU type of the PDU session based on the IP version requested by the application, the IP version supported by the DNN, and the IP stack capability of the UE. Therefore, the requested PDU type of the PDU session can be consistent with the IP version requested by the application, such that the application can normally perform communication.

In addition, this embodiment of the present disclosure further provides a plurality of optional implementations.

In a possible implementation, before the UE sets the requested PDU type of the PDU session, the UE receives the UE policy from the PCF, where the UE policy includes the IP version requested by the application. This way, the UE can set the requested PDU type of the PDU session based on the IP version requested by the application. For example, the UE sets the requested PDU type of the PDU session to the IP version requested by the application. In this implementation, both the IP stack capability of the UE and the IP version supported by the DNN usually support both IPv4 and IPv6. Therefore, processing resources can be saved when only the IP version requested by the application is considered to set the requested PDU type of the PDU session.

In a possible implementation, before the UE sets the requested PDU type of the PDU session, the UE receives the UE policy from the PCF, where the UE policy includes the IP version requested by the application and the DNN. As such, the UE can set the requested PDU type of the PDU session based on the IP version requested by the application and the IP version supported by the DNN.

For example, the UE sets, in a process of establishing the PDU session, the requested PDU type of the PDU session to an intersection of the IP version requested by the application and the IP stack capability of the UE. In this implementation, the UE sets the requested PDU type of the PDU session to the intersection of the IP version corresponding to the application and the IP stack capability of the UE. As such, the PDU type meets both an application requirement and a UE capability requirement, thereby correspondingly improving a possibility that the application can normally perform communication.

For another example, the UE sets, in a process of establishing the PDU session, the requested PDU type of the PDU session to an intersection of the IP version requested by the application and the IP version supported by the DNN. In this implementation, the UE sets the requested PDU type of the PDU session to the intersection of the IP version requested by the application and the IP version supported by the DNN. As such, the PDU type meets both an application requirement and a DNN capability requirement, thereby correspondingly improving a possibility that the application can normally perform communication.

For another example, the UE sets, in a process of establishing the PDU session, the requested PDU type of the PDU session to the intersection of the IP version requested by the application, the IP stack capability of the UE, and the IP version supported by the DNN. In this implementation, the UE sets the requested PDU type of the PDU session to the intersection of the IP version requested by the application, the IP stack capability of the UE, and the IP version supported by the DNN. As such, the PDU type meets an application requirement, a UE capability requirement, and a DNN capability requirement, thereby correspondingly improving a possibility that the application can normally perform communication.

Figure 4:
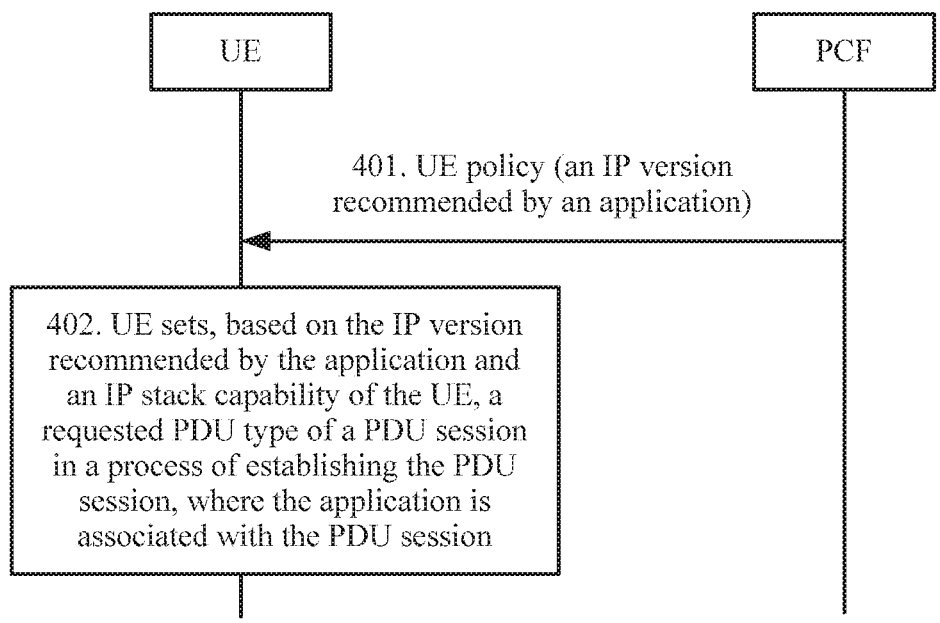
FIG. 4 is a schematic communication diagram of another PDU type setting method according to an embodiment of the present disclosure.

FIG. 4 is a schematic communication diagram of another PDU type setting method according to an embodiment of the present disclosure. An IP version corresponding to an application is an IP version recommended by the application. The method includes the following steps.

Step 401. A PCF sends a UE policy to UE, where the UE policy includes an IP version recommended by an application.

In an example, the PCF may determine, based on an IP version requested by the application and an IP version supported by a DNN, the IP version recommended by the application. For example, an intersection of the IP version requested by the application and the IP version supported by the DNN is used as the IP version recommended by the application.

Applications may have different DNNs. In this case, the DNN is a DNN of the application. For example, if the DNN is the Internet, it indicates that a data network of the application is the Internet.

In an example, the IP version requested by the application may include "IPv4", "IPv6", and "IP". "IP" indicates that the application supports both IPv4 and IPv6.

Step 402. The UE sets, based on the IP version recommended by the application and an IP stack capability of the UE, a requested PDU type of a PDU session in a process of establishing the PDU session, where the application is associated with the PDU session.

The IP stack capability of the UE may be pre-stored in the UE.

In a possible implementation, the UE sets, in the process of establishing the PDU session, the requested PDU type of the PDU session to an intersection of the IP version recommended by the application and the IP stack capability of the UE. To be more specific, the UE selects, as the requested PDU type of the PDU session, an IP version jointly supported by the IP version recommended by the application and the IP stack capability of the UE. For example, if the IP version recommended by the application is IPv4, and the IP stack capability of the UE supports both IPv4 and IPv6, the IP version jointly supported by the IP version recommended by the application and the IP stack capability of the UE is IPv4. In this case, IPv4 is used as the requested PDU type of the PDU session.

In this implementation, the UE sets the requested PDU type of the PDU session to the intersection of the IP version recommended by the application and the IP stack capability of the UE. Because the IP version recommended by the application reflects both an application requirement and a DNN capability requirement, the PDU type meets the application requirement, a UE capability requirement, and the DNN capability requirement, thereby correspondingly improving a possibility that the application can normally perform communication.

The following describes, using an example, the PDU type setting method provided in this embodiment of the present disclosure.

Figure 5:
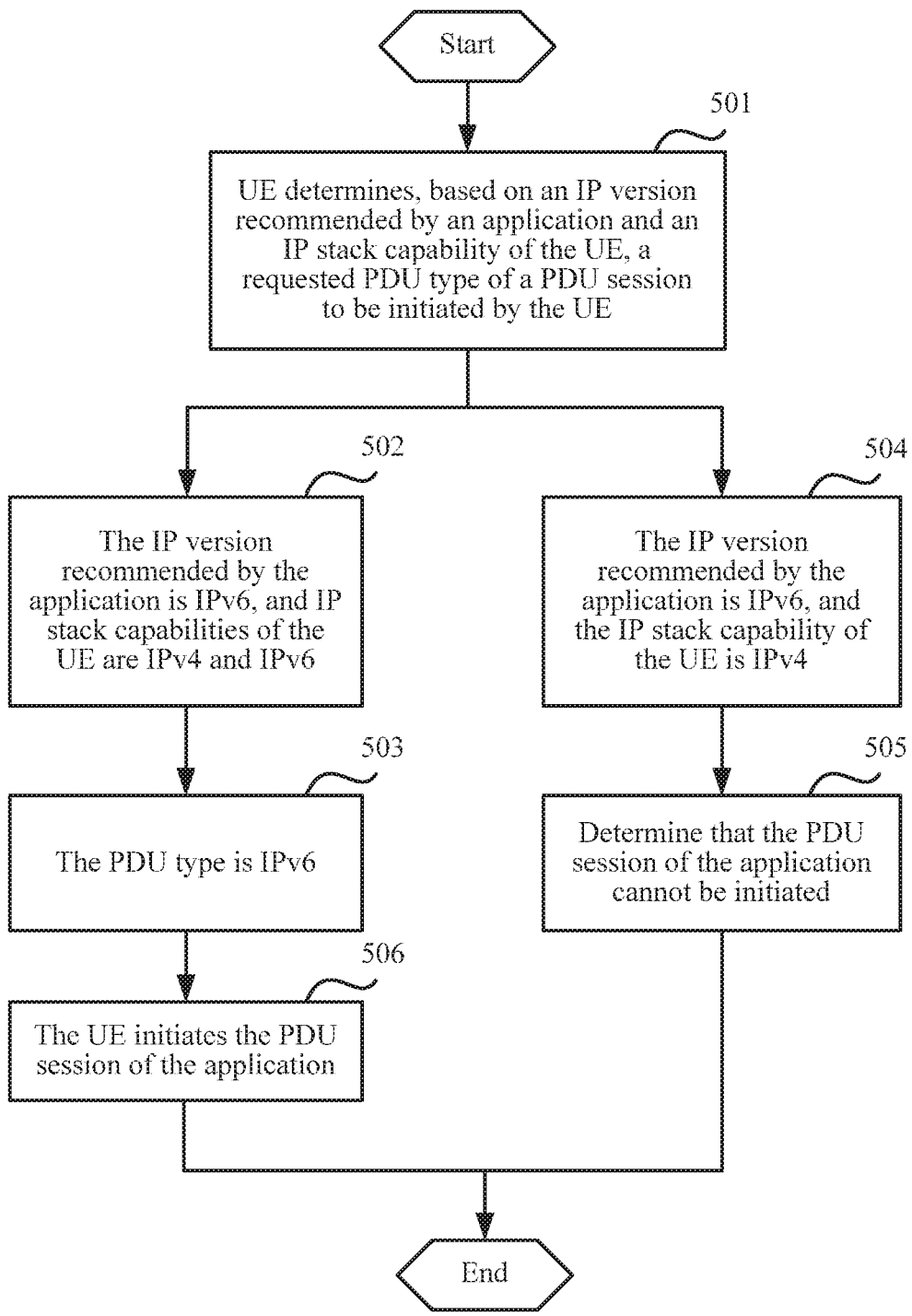
FIG. 5 is a flowchart of a method in which a requested PDU type of a PDU session is determined based on an IP version recommended by an application according to an embodiment of the present disclosure.

FIG. 5 is a flowchart of a method in which a requested PDU type of a PDU session is determined based on an IP version recommended by an application according to an embodiment of the present disclosure. The method includes the following steps.

Step 501. A UE determines, based on an IP version recommended by an application and an IP stack capability of the UE, a requested PDU type of a PDU session to be initiated by the UE.

In an example, when there is an IP version jointly supported by the IP version recommended by the application and the IP stack capability of the UE, the UE determines the jointly supported IP version as the requested PDU type of the PDU session to be initiated by the UE. The UE subsequently initiates the PDU session of the application based on the determined PDU type. When there is no IP version jointly supported by the IP version recommended by the application and the IP stack capability of the UE, the UE cannot initiate the PDU session of the application.

Step 502. Obtain the following information: the IP version recommended by the application is IPv6, and IP stack capabilities of the UE are IPv4 and IPv6.

In an example, the UE may be configured to: receive a URSP from a PCF; obtain, from the URSP, the IP version recommended by the application; and obtain the pre-stored IP stack capability of the UE.

Step 503. Determine, based on the information obtained in step 502, that the PDU type is IPv6.

In an example, the UE may select, as the requested PDU type of the PDU session, an intersection of the IP version recommended by the application and the IP stack capability of the UE.

After determining the PDU type, the UE may subsequently perform step 506.

Step 504. Obtain the following information: the IP version recommended by the application is IPv6, and the IP stack capability of the UE is IPv4.

In an example, the UE may be configured to: receive a URSP from a PCF; obtain, from the URSP, the IP version recommended by the application; and obtain the pre-stored IP stack capability of the UE.

Step 505. Determine, based on the information obtained in step 504, that the PDU session of the application cannot be initiated.

In an example, the UE may determine whether the IP version recommended by the application and the IP stack capability of the UE have an intersection. When the IP version recommended by the application and the IP stack capability of the UE have no intersection, the UE determines that the PDU session of the application cannot be initiated.

Step 506. The UE initiates the PDU session of the application based on the determined PDU type.

In an example, the UE may determine whether the IP version recommended by the application and the IP stack capability of the UE have an intersection. When the IP version recommended by the application and the IP stack capability of the UE have an intersection, the UE uses, as the requested PDU type of the PDU session, the intersection of the IP version recommended by the application and the IP stack capability of the UE. The then UE initiates the PDU session of the application based on the determined PDU type.

It can be learned from FIG. 5 that the UE determines, based on the IP version recommended by the application and the IP stack capability of the UE, the PDU type of the PDU session to be initiated by the UE. If the IP version recommended by the application and the IP stack capability of the UE have an intersection, the UE initiates the PDU session of the application. If the IP version recommended by the application and the IP stack capability of the UE have no intersection, the UE cannot initiate the PDU session of the application.

In this embodiment of the present disclosure, the UE first determines whether the IP version recommended by the application and the IP stack capability of the UE have an intersection. When the IP version recommended by the application and the IP stack capability of the UE have no intersection, the UE determines that the PDU session of the application cannot be initiated. As such, network resources can be saved, that is, the PDU session is established without wasting the network resources. When the IP version recommended by the application and the IP stack capability of the UE have an intersection, the UE uses, as the requested PDU type of the PDU session, the intersection of the IP version recommended by the application and the IP stack capability of the UE. Then the UE initiates the PDU session of the application based on the determined PDU type, such that a possibility that the application can normally perform communication can be improved.

In this embodiment of the present disclosure, because a UE policy includes the IP version recommended by the application, and the IP version recommended by the application is determined based on an IP version requested by the application and an IP version supported by a DNN, the UE may set the requested PDU type of the PDU session based on the IP version recommended by the application and the IP stack capability of the UE. Therefore, the requested PDU type of the PDU session can be consistent with the IP version requested by the application, such that the application can normally perform communication.

In addition, this embodiment of the present disclosure further provides a plurality of optional implementations.

In a possible implementation, before the UE sets the requested PDU type of the PDU session, the UE receives the UE policy from the PCF. The UE policy includes the IP version recommended by the application, such that the UE can set the requested PDU type of the PDU session based on the IP version recommended by the application. The IP version recommended by the application is an IP version determined based on the IP version supported by the DNN and the IP version requested by the application. To be more specific, an intersection of the IP version supported by the DNN and the IP version requested by the application may be used as the IP version recommended by the application. For example, if IP versions supported by the DNN are IPv4 and IPv6, and the IP version requested by the application is IPv4, the IP version recommended by the application is IPv4.

For example, the UE sets, in a process of establishing the PDU session, the requested PDU type of the PDU session to the IP version recommended by the application. In this implementation, the IP stack capability of the UE usually supports both IPv4 and IPv6. Therefore, processing resources can be saved when only the IP version recommended by the application is considered to set the requested PDU type of the PDU session.

For another example, the UE sets, in a process of establishing the PDU session, the requested PDU type of the PDU session to the intersection of the IP version recommended by the application and the IP stack capability of the UE. In this implementation, the UE sets the requested PDU type of the PDU session to the intersection of the IP version recommended by the application and the IP stack capability of the UE. As such, the PDU type meets an application requirement, a DNN capability requirement, and a UE capability requirement, thereby correspondingly improving a possibility that the application can normally perform communication.

The following describes, using an embodiment, a process in which the UE obtains the URSP.

Figure 6:
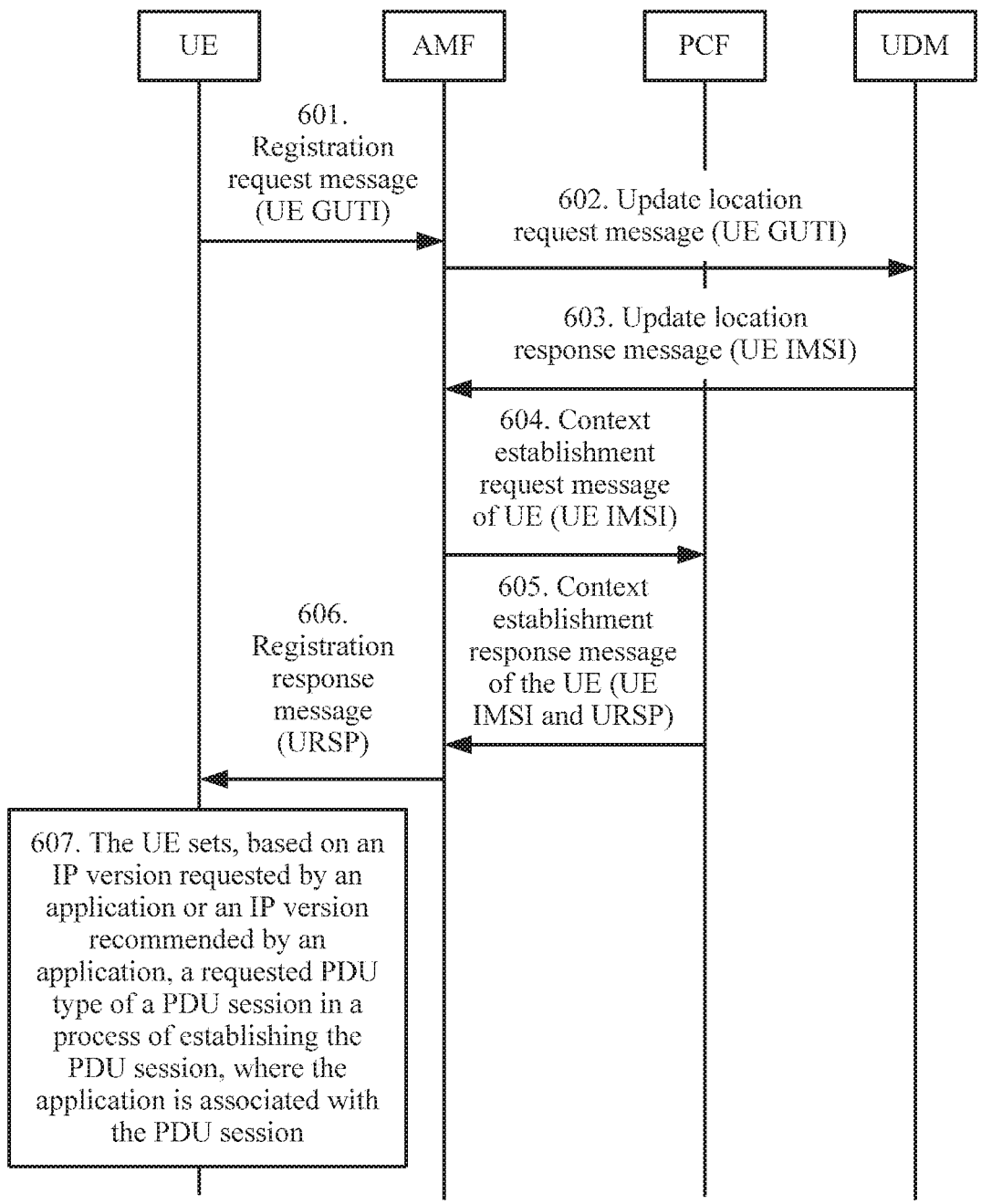
FIG. 6 is a schematic communication diagram of a method for obtaining a URSP according to an embodiment of the present disclosure.

FIG. 6 is a schematic communication diagram of a method for obtaining a URSP according to an embodiment of the present disclosure. The URSP includes an IP version requested by an application or an IP version recommended by an application. The method includes the following steps.

Step 601. A UE sends a registration request message to an AMF, where the registration request message carries a globally unique temporary identity (GUTI) of the UE.

Step 602. The AMF sends an update location request message to a unified data management (UDM) function entity, where the update location request message carries the GUTI of the UE.

Step 603. The UDM sends an update location response (e.g., Update Location Acknowledgment (Ack)) message to the AMF, where the update location response message carries subscription information of the user equipment (UE's Subscription). The subscription information of the user equipment includes an international mobile subscriber identity (IMSI) of the UE.

In addition to the IMSI of the UE, the subscription information of the user equipment may include other subscription information. Details are not described herein.

Step 604. The AMF sends a context establishment request message of the UE to a PCF, where the context establishment request message carries the IMSI of the UE.

Step 605. The PCF sends a context establishment response message of the UE to the AMF, where the context establishment response message carries the IMSI of the UE and a URSP.

The URSP includes an IP version requested by an application or an IP version recommended by an application.

In an example, the URSP includes the IP version recommended by the application. Before the PCF sends the URSP to the UE, the PCF determines, based on an IP version supported by a DNN and the IP version requested by the application, the IP version recommended by the application. In this implementation, the IP version recommended by the application reflects both the IP version requested by the application and the IP version supported by the DNN, and therefore includes a large amount of information.

In another example, the URSP includes the IP version requested by the application and a DNN. In this implementation, the PCF sends the URSP to the UE, such that the UE can not only obtain the IP version requested by the application, but also obtain the DNN. This way, when setting a requested PDU type of a PDU session, the UE can not only consider the IP version requested by the application associated with the PDU session, but also consider an IP version supported by the DNN. Therefore, the requested PDU type of the PDU session can be consistent with a PDU type requested by the application, and can also be consistent with the IP version supported by the DNN.

Step 606. The AMF sends a registration response (e.g., Registration Accept) message to the UE, where the registration response message carries the URSP.

The URSP includes the IP version requested by the application or the IP version recommended by the application.

Optionally, this embodiment of the present disclosure further includes the following step.

Step 607. The UE sets, based on an IP version requested by an application or an IP version recommended by an application, a requested PDU type of a PDU session in a process of establishing the PDU session, where the application is associated with the PDU session.

In this embodiment of the present disclosure, the PCF sends the URSP to the UE, where the URSP includes the IP version requested by the application or the IP version recommended by the application. As such, the UE can set the requested PDU type of the PDU session based on the IP version requested by the application or the IP version recommended by the application, thereby correspondingly improving a possibility that the application normally performs communication.

The foregoing mainly describes the solutions in the embodiments of the present disclosure from the perspective of interaction between network elements. It may be understood that, to implement the foregoing functions, the network elements such as the UE and the PCF include a corresponding hardware structure and/or software module for performing the functions. A person of ordinary skill in the art should be aware that, units and algorithm steps in the examples described with reference to the embodiments disclosed in this specification may be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, the UE, the PCF, and the like may be divided into function modules based on the foregoing method examples. For example, each function module may be obtained through division for each corresponding function, or two or more functions may be integrated into one processing module. The integrated module may be implemented in a form of hardware, or may be implemented in a form of a software function module. It should be noted that the module division in the embodiments of the present disclosure is an example, and is merely logical function division. There may be another division manner in actual implementation.

Figure 7:
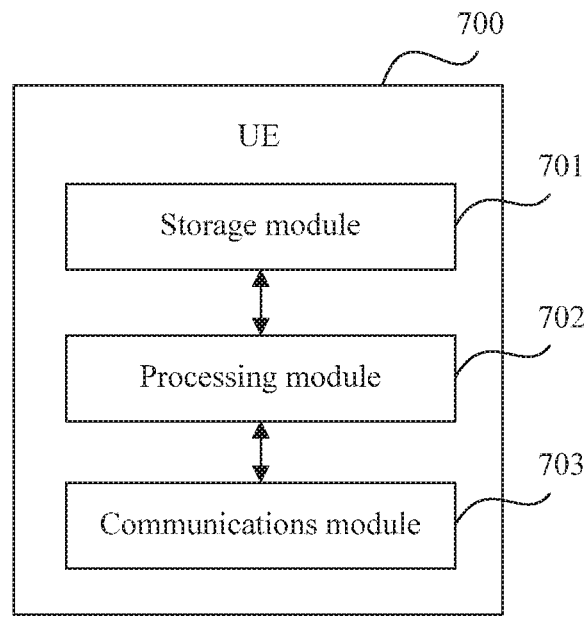
FIG. 7 is a structural diagram of UE according to an embodiment of the present disclosure.

When an integrated module is used, FIG. 7 is a possible schematic structural diagram of the UE in the foregoing embodiment. The UE 700 includes a processing module 702 and a communications module 703. The processing module 702 is configured to control and manage an action of the UE.

In an example, the processing module 702 is configured to set a requested PDU type of a PDU session in a process of establishing the PDU session using the communications module 703. The requested PDU type of the PDU session is set based on a first condition, which includes an IP version corresponding to an application, where the application is associated with the PDU session.

In an example, before the processing module 702 sets the requested PDU type of the PDU session, the processing module 702 is further configured to receive a UE policy from a PCF using the communications module 703. The UE policy includes the IP version corresponding to the application.

In an example, before the processing module 702 sets the requested PDU type of the PDU session, the processing module 702 is further configured to receive a UE policy from a PCF using the communications module 703. The UE policy includes the IP version corresponding to the application and a DNN.

In an example, the IP version corresponding to the application includes an IP version requested by the application or an IP version recommended by the application.

In an example, the IP version recommended by the application is an IP version determined based on an IP version supported by the DNN and the IP version requested by the application.

An example in which the processing module 702 sets a requested PDU type of a PDU session in a process of establishing the PDU session using the communications module 703 includes: setting, in the process of establishing the PDU session using the communications module 703, the requested PDU type of the PDU session to the IP version corresponding to the application.

In an example, the first condition further includes at least one of the following: an IP stack capability of the UE or the IP version supported by the DNN.

An example in which the processing module 702 sets a requested PDU type of a PDU session in a process of establishing the PDU session using the communications module 703 includes: when the first condition includes the IP version corresponding to the application and the IP stack capability of the UE, setting, in the process of establishing the PDU session, the requested PDU type of the PDU session to an intersection of the IP version corresponding to the application and the IP stack capability of the UE.

An example in which the processing module 702 sets a requested PDU type of a PDU session in a process of establishing the PDU session using the communications module 703 includes: when the IP version corresponding to the application is the IP version requested by the application, and the first condition includes the IP version requested by the application and the IP version supported by the DNN, setting, in the process of establishing the PDU session, the requested PDU type of the PDU session to an intersection of the IP version requested by the application and the IP version supported by the DNN.

An example in which the processing module 702 sets a requested PDU type of a PDU session in a process of establishing the PDU session using the communications module 703 is as follows. When the IP version corresponding to the application is the IP version requested by the application, and the first condition includes the IP version requested by the application, the IP stack capability of the UE, and the IP version supported by the DNN, the UE sets, in the process of establishing the PDU session, the requested PDU type of the PDU session to an intersection of the IP version requested by the application, the IP stack capability of the UE, and the IP version supported by the DNN.

For example, the processing module 702 is configured to support the UE in performing the process 202 in FIG. 2, the processes in FIG. 3, the process 402 in FIG. 4, the processes in FIG. 5, and the processes 601 and 607 in FIG. 6, and/or is configured to perform another process of the technology described in this specification. The communications module 703 is configured to support the UE in communicating with another network entity, for example, communicating with the PCF. The UE may further include a storage module 701 configured to store program code and data of the UE.

In this embodiment of the present disclosure, when setting the requested PDU type of the PDU session in the process of establishing the PDU session using the communications module 703, the processing module 702 considers the IP version corresponding to the application associated with the PDU session. Therefore, the requested PDU type of the PDU session can be consistent with a PDU type requested by the application, such that the application can normally perform communication.

The processing module 702 may be a processor or a controller, such as a central processing unit (CPU), a general purpose processor, a digital signal processor (DSP), an application-specific integrated circuit (ASIC), a field programmable gate array (FPGA) or another programmable logic device, a transistor logic device, a hardware component, or a combination thereof. The processing module 702 may implement or execute various example logical blocks, modules, and circuits described with reference to content disclosed in the present disclosure. Alternatively, the processor may be a combination that implements a computing function, for example, a combination of one or more microprocessors, or a combination of a DSP and a microprocessor. The communications module 703 may be a communications interface, a transceiver, a transceiver circuit, or the like. The communications interface is a general term, and may include one or more interfaces. The storage module 701 may be a memory.

Figure 8:
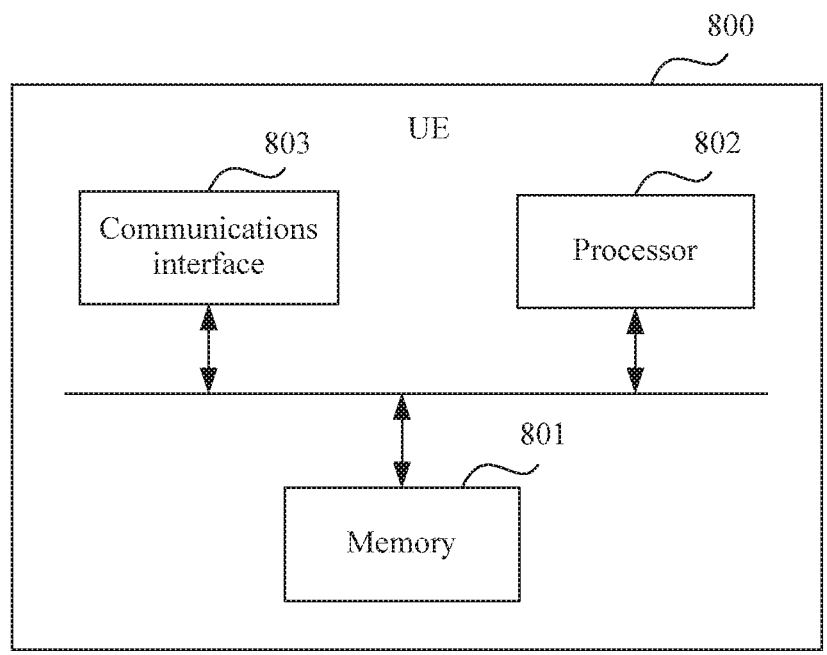
FIG. 8 is a structural diagram of another UE according to an embodiment of the present disclosure.

When the processing module 702 is a processor, the communications module 703 is a communications interface, and the storage module 701 is a memory, the UE in this embodiment of the present disclosure may be a UE shown in FIG. 8.

Referring to FIG. 8, the UE 800 includes a processor 802, a communications interface 803, and a memory 801. The communications interface 803, the processor 802, and the memory 801 may be connected to each other using a communication connection.

Figure 9:
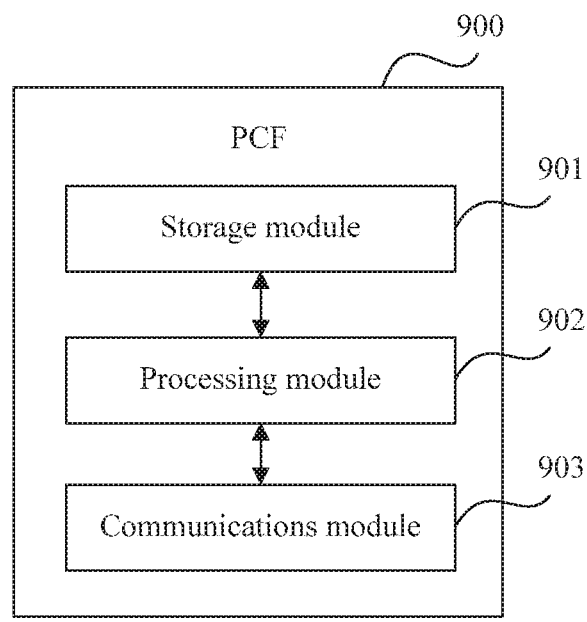
FIG. 9 is a structural diagram of a PCF according to an embodiment of the present disclosure.

When an integrated module is used, FIG. 9 is a possible schematic structural diagram of the PCF in the foregoing embodiment. A PCF 900 includes a processing module 902 and a communications module 903. The processing module 902 is configured to control and manage an action of the PCF.

In an example, the processing module 902 is configured to send a UE policy to a UE using the communications module 903. The UE policy includes an IP version corresponding to an application, where the IP version corresponding to the application is used by the UE to set a requested PDU type of a PDU session, and where the application is associated with the PDU session.

In an example, the IP version corresponding to the application includes an IP version requested by the application or an IP version recommended by the application.

In an example, before the processing module 902 sends the UE policy to the UE using the communications module 903, the processing module 902 is further configured to determine, based on an IP version supported by a DNN and the IP version requested by the application, the IP version recommended by the application. The IP version corresponding to the application is the IP version recommended by the application.

In an example, the UE policy further includes the DNN.

For example, the processing module 902 is configured to support the PCF in performing the process 201 in FIG. 2, the process 401 in FIG. 4, and the process 605 in FIG. 6, and/or is configured to perform another process of the technology described in this specification. The communications module 903 is configured to support the PCF in communicating with another network entity, for example, communicating with the UE. The PCF may further include a storage module 901 configured to store program code and data of the PCF.

In this embodiment of the present disclosure, the processing module 902 sends the UE policy to the UE using the communications module 903, where the UE policy includes the IP version corresponding to the application. As such, the UE can set the requested PDU type of the PDU session based on the IP version corresponding to the application.

The processing module 902 may be a processor or a controller, such as a central processing unit (CPU), a general purpose processor, a digital signal processor (DSP), an application-specific integrated circuit (ASIC), a field programmable gate array (FPGA) or another programmable logic device, a transistor logic device, a hardware component, or a combination thereof. The processing module 902 may implement or execute various example logical blocks, modules, and circuits described with reference to content disclosed in the present disclosure. Alternatively, the processor may be a combination that implements a computing function, for example, a combination of one or more microprocessors, or a combination of a DSP and a microprocessor. The communications module 903 may be a communications interface, a transceiver, a transceiver circuit, or the like. The communications interface is a general term, and may include one or more interfaces. The storage module 801 may be a memory.

Figure 10:
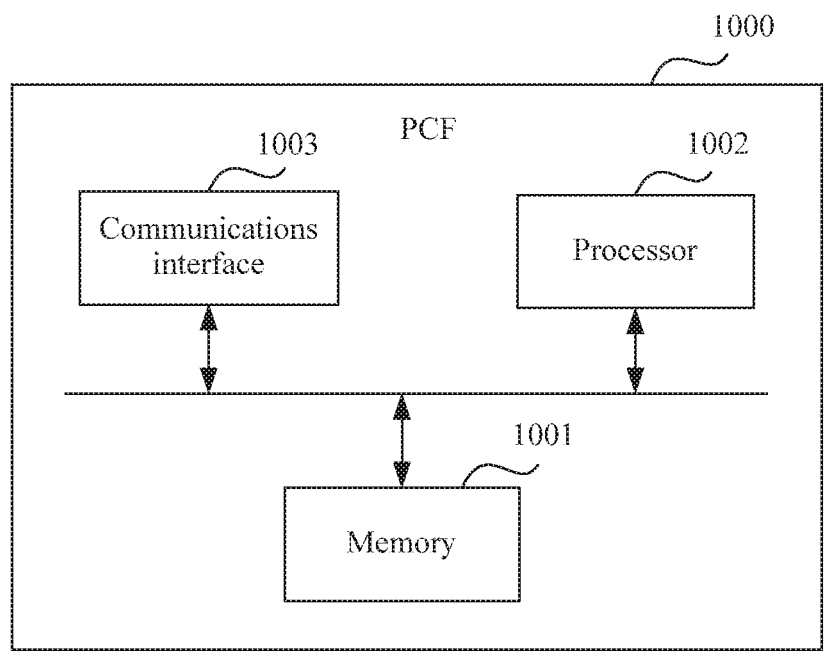
FIG. 10 is a structural diagram of another PCF according to an embodiment of the present disclosure.

When the processing module 902 is a processor, the communications module 903 is a communications interface, and the storage module 901 is a memory, the PCF in this embodiment of the present disclosure may be a PCF shown in FIG. 10.

Referring to FIG. 10, the PCF 1000 includes a processor 1002, a communications interface 1003, and a memory 1001. The communications interface 1003, the processor 1002, and the memory 1001 may be connected to each other using a communication connection.

All or some of the foregoing embodiments of the present disclosure may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The objectives, technical solutions, and beneficial effects of the present disclosure are further described in detail in the foregoing embodiments. It should be understood that the foregoing descriptions are merely example embodiments of the present disclosure, and are not intended to limit the protection scope of the present disclosure. Any modification, equivalent replacement, or improvement made within the spirit and principle of the present disclosure shall fall within the protection scope of the present disclosure.

What is claimed is:

1. A protocol data unit (PDU) type setting method, comprising:
   obtaining, by a user equipment (UE), a user equipment route selection policy (URSP) stored in a policy control function (PCF) entity, wherein the URSP comprises a data network name (DNN) and a PDU type supported by a first application, and wherein the PDU type supported by the first application comprises an Internet Protocol (IP) version supported by the first application; and
   sending, by the UE, a request for establishing a PDU session associated with the first application, wherein a PDU type of the PDU session is set by the UE based on a first condition, wherein the first condition comprises the PDU type supported by the first application, wherein the PDU type of the PDU session is the IP version supported by the first application, wherein the IP version supported by the first application is the IP version requested by the first application, wherein the first condition comprises the IP version requested by the first application and the IP version supported by the DNN, and wherein sending the request comprises setting, by the UE, the PDU type of the PDU session to an intersection of the IP version requested by the first application and the IP version supported by the DNN.

2. The PDU type setting method of claim 1, wherein obtaining the URSP comprises:
   sending, by the UE, a registration request message to an access and mobility management function (AMF) entity, wherein the registration request message carries a globally unique temporary identity (GUTI) of the UE; and
   receiving, by the UE, a registration response message from the AMF entity, wherein the registration response message carries the URSP for the UE from the PCF entity.

3. The PDU type setting method of claim 1, wherein obtaining the URSP comprises:
   sending, by the UE, a registration request message to an access and mobility management function (AMF) entity, wherein the registration request message carries a globally unique temporary identity (GUTI) of the UE; and
   receiving, by the UE, a registration response message from the AMF entity, wherein the registration response message carries the URSP for the UE from the PCF entity.

4. The PDU type setting method of claim 2, wherein after the UE sends the registration request message to the AMF entity and before the UE receives the registration response message from the AMF entity, the GUTI of the UE is carried in an update location request message from the AMF entity to a unified data management (UDM) and the URSP is carried in a context establishment response message from the PCF entity to the AMF entity.

5. The PDU type setting method of claim 3, wherein after the UE sends the registration request message to the AMF entity and before the UE receives the registration response message from the AMF entity, the GUTI of the UE is carried in an update location request message from the AMF entity to a unified data management (UDM) and the URSP is carried in a context establishment response message from the PCF entity to the AMF entity.

6. The PDU type setting method of claim 1, wherein the first condition further comprises the IP stack capability of the UE, and wherein sending the request further comprises setting, by the UE, the PDU type of the PDU session to the IP stack capability of the UE.

7. The PDU type setting method of claim 1, wherein the IP version comprises IP version 4.

8. The PDU type setting method of claim 1, wherein the IP version comprises IP version 6.

9. A user equipment (UE), comprising:
   a processor; and
   a memory coupled to the processor and configured to store a program instruction that, when executed by the processor, causes the UE to:
      obtain a user equipment route selection policy (URSP) stored in a policy control function (PCF) entity, wherein the URSP comprises a data network name (DNN) and a protocol data unit (PDU) type supported by a first application, and wherein the PDU type supported by the first application comprises an Internet Protocol (IP) version supported by the first application; and
      send a request for establishing a PDU session associated with the first application, wherein a PDU type of the PDU session is set by the UE based on a first condition, wherein the first condition comprises the PDU type supported by the first application, wherein the PDU type of the PDU session is the IP version supported by the first application, wherein the IP version supported by the first application is the IP version requested by the first application, wherein the first condition comprises the IP version requested by the first application and the IP version supported by the DNN, and wherein sending the request comprises setting, by the UE, the PDU type of the PDU session to an intersection of the IP version requested by the first application and the IP version supported by the DNN.

10. The UE of claim 9, wherein the UE is configured to obtain the URSP by:
sending a registration request message to an access and mobility management function (AMF) entity, wherein the registration request message carries a globally unique temporary identity (GUTI) of the UE; and
receiving a registration response message from the AMF entity, wherein the registration response message carries the URSP for the UE from the PCF entity.

11. The UE of claim 9, wherein the UE is configured to obtain the URSP by:
sending a registration request message to an access and mobility management function (AMF) entity, wherein the registration request message carries a globally unique temporary identity (GUTI) of the UE; and
receiving a registration response message from the AMF entity, wherein the registration response message carries the URSP for the UE from the PCF entity.

12. The UE of claim 10, wherein after sending the registration request message to the AMF entity and before receiving the registration response message from the AMF entity, the GUTI of the UE is carried in an update location request message from the AMF entity to a unified data management (UDM) and the URSP is carried in a context establishment response message from the PCF entity to the AMF entity.

13. The UE of claim 11, wherein after sending the registration request message to the AMF entity and before receiving the registration response message from the AMF entity, the GUTI of the UE is carried in an update location request message from the AMF entity to a unified data management (UDM) and the URSP is carried in a context establishment response message from the PCF entity to the AMF entity.

14. The UE of claim 9, wherein the first condition further comprises the IP stack capability of the UE, and wherein the UE sends the request by setting the PDU type of the PDU session to the IP stack capability of the UE.

15. The UE of claim 9, wherein the IP version comprises IP version 4.

16. The UE of claim 9, wherein the IP version comprises IP version 6.

17. A non-transitory computer readable storage medium that stores instructions that, when executed by a processor of a user equipment (UE), cause the UE to perform a protocol data unit (PDU) type setting method, the PDU type setting method comprising:
obtaining a user equipment route selection policy (URSP) stored in a policy control function (PCF) entity, wherein the URSP comprises a data network name (DNN) and a PDU type supported by a first application, and wherein the PDU type supported by the first application comprises an Internet Protocol (IP) version supported by the first application; and
sending a request for establishing a PDU session associated with the first application, wherein a PDU type of the PDU session is set by the UE based on a first condition, wherein the first condition comprises the PDU type supported by the first application, wherein the PDU type of the PDU session is the IP version supported by the first application, wherein the IP version supported by the first application is the IP version requested by the first application, wherein the first condition comprises the IP version requested by the first application and the IP version supported by the DNN, and wherein sending the request comprises setting, by the UE, the PDU type of the PDU session to an intersection of the IP version requested by the first application and the IP version supported by the DNN.

18. The non-transitory computer readable storage medium of claim 17, wherein the IP version comprises IP version 4 or IP version 6.

* * * * *